(12) United States Patent
Evans-Beauchamp et al.

(10) Patent No.: US 6,895,398 B2
(45) Date of Patent: May 17, 2005

(54) DECISION ENGINE AND METHOD AND APPLICATIONS THEREOF

(75) Inventors: Lincoln T. Evans-Beauchamp, Palo Alto, CA (US); Jeremy Link, Belmont, CA (US)

(73) Assignee: Inferscape, Inc., San Mateo, CA (US)

( * ) Notice: Subject to any disclaimer, the term of this patent is extended or adjusted under 35 U.S.C. 154(b) by 703 days.

(21) Appl. No.: 09/908,984

(22) Filed: Jul. 18, 2001

(65) Prior Publication Data

US 2003/0126104 A1 Jul. 3, 2003

(Under 37 CFR 1.47)

Related U.S. Application Data

(60) Provisional application No. 60/219,008, filed on Jul. 18, 2000.

(51) Int. Cl.[7] ................................................. G06N 5/00
(52) U.S. Cl. .......................................... 706/50; 706/45
(58) Field of Search ................................ 703/2; 706/52

(56) References Cited

U.S. PATENT DOCUMENTS

| | | | |
|---|---|---|---|
| 4,870,579 A | 9/1989 | Hey | |
| 4,996,642 A | 2/1991 | Hey | |
| 5,133,046 A | 7/1992 | Kaplan | |
| 5,471,382 A | 11/1995 | Tallman et al. | |
| 5,539,704 A | 7/1996 | Doyen et al. | |
| 5,659,771 A | 8/1997 | Golding | |
| 5,696,884 A | 12/1997 | Heckerman et al. | |
| 5,696,964 A | 12/1997 | Cox et al. | |
| 5,704,017 A | 12/1997 | Heckerman et al. | |
| 5,704,018 A | 12/1997 | Heckerman et al. | |
| 5,715,374 A | 2/1998 | Heckerman et al. | |
| 5,764,923 A | 6/1998 | Tallman et al. | |
| 5,787,236 A | 7/1998 | Tucci | |
| 5,802,256 A | 9/1998 | Heckerman et al. | |
| 5,844,817 A | 12/1998 | Lobley et al. | |
| 5,855,011 A | 12/1998 | Tatsuoka | |
| 5,987,415 A | 11/1999 | Breese et al. | |
| 5,999,893 A | 12/1999 | Lynch, Jr. et al. | |
| 6,024,705 A | 2/2000 | Schlager et al. | |
| 6,056,690 A | 5/2000 | Roberts | |
| 6,067,565 A | 5/2000 | Horvitz | |
| 6,345,265 B1 * | 2/2002 | Thiesson et al. | 706/52 |
| 6,408,290 B1 * | 6/2002 | Thiesson et al. | 706/52 |
| 6,556,958 B1 * | 4/2003 | Chickering | 703/2 |

OTHER PUBLICATIONS

Manna; "Online Personalization for E–Commerce: The Manna Advantage"; Manna, Inc. (Feb. 2000).
Manna; "FrontMind™ White Paper"; Manna, Inc. (Feb. 2000).

* cited by examiner

Primary Examiner—Wilbert L. Starks, Jr.
(74) Attorney, Agent, or Firm—Mark D. Wieczorek

(57) ABSTRACT

A method of creating a decision engine including a Bayesian network. The method includes retrieving data from a client database and forming a focus database; applying a set of initial rules to the focus database to form at least two nodes; applying a first learning process to determine a set of arcs to be applied between the at least two nodes; applying a second learning process to determine a set of states to be applied within each node; applying a third learning process to determine a set of probabilities applicable to the states learned in the second learning process; and applying a fourth learning process to update a structure of the at least two nodes, the set of arcs, the set of states within each node, and the set of probabilities for the states.

20 Claims, 4 Drawing Sheets

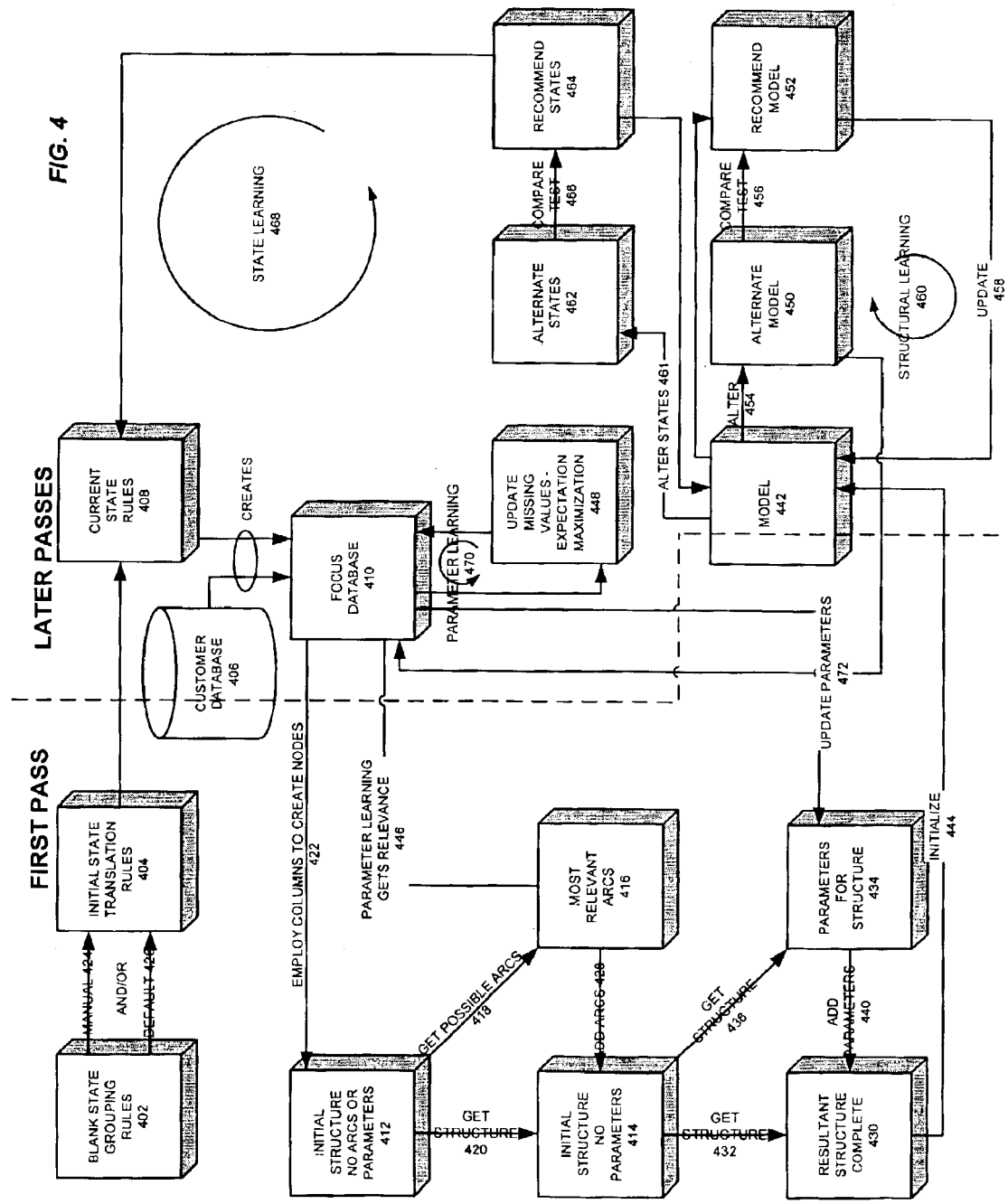

DECISION ENGINE AND METHOD AND APPLICATIONS THEREOF

CROSS-REFERENCES TO RELATED APPLICATIONS

This is a conversion of U.S. Provisional Patent Application Ser. No. 60/219,008, entitled "Decision Engine and Method and Applications Thereof", filed Jul. 18, 2000, by Evans-Beauchamp et al.

CROSS REFERENCE TO FEDERAL FUNDING

N/A

CROSS REFERENCE TO MICROFICHE APPENDIX

N/A

BACKGROUND OF THE INVENTION

A. Field of the Invention

This invention pertains to decision analysis, and more particularly to decision analysis software employing Bayesian networks ("BN"), also known as "belief networks".

B. Background

Decision systems are of increasing importance in today's society as the volume of available information explodes and the required computing capability for analyzing this information vastly increases.

One type of decision system is a rule-based system ("RBS"). This type of system has several disadvantages. While the user may view individual rules, the system is otherwise a "black box". In addition, performance degrades proportionally to the size of the database. Further, a RBS may produce undesirable results if the processing is "noisy" or if the information is incomplete. Even further, the information per se is exceedingly difficult if not altogether impossible to separate from the software embodying the knowledge.

In some cases, a RBS can create contradictory answers. RBS code typically analyzes a first section of the data and creates a multitude of rules that predict a value. Later, additional data is available, and additional rules are created to handle the newly learned areas. What can now exist is a case where, with a given set of data, the answer is positive, but when taken in a different order, the answer is negative, both with the same data. This can obviously lead to unacceptable results.

Another type of decision system employs a neural network ("NN"). NNs also have disadvantages. For example, they are primarily also "black boxes", allowing virtually no observation or understanding of the results of their systems or reasoning. Like RBS, their knowledge cannot be separated from their software implementation. Further, the non-linear approach of a NN produces results that can vary for identical inputs.

Various other attempts have been made to advance decision systems. For example, U.S. Pat. No. 5,715,374 discloses a method and system for case-based reasoning ("CBR") employing a belief network. This patent, however, fails to show at least employment of a pre-existing database or intelligent decision analysis. U.S. Pat. No. 5,704,017 discloses an improved collaborative filtering system using a belief network. It suffers from many of the same deficiencies as the '374 patent above. U.S. Pat. No. 5,987,415 discloses a technique employing a BN that uses inputs from a user to model the user's emotion and personality, but is deficient as an integrated decision engine for at least similar reasons as the patents above. U.S. Pat. No. 5,704,018 and its related cases disclose a belief network in which expert knowledge and empirical data form the basis for creation of the network; U.S. Pat. No. 6,056,690 discloses a belief network for diagnosing breast cancer; U.S. Pat. No. 6,024,705 discloses Bayesian analysis to partially analyze heart performance and diagnose myocardial ischemia; all of these references disclose BNs but do not employ at least some techniques characteristic of intelligent decision systems.

SUMMARY OF THE INVENTION

The invention remedies many of the deficiencies of the prior art noted above.

In particular, in one aspect, the invention is directed to a method of creating a decision engine including a Bayesian network. The method includes retrieving data from a client database and forming a focus database; applying a set of initial rules to the focus database to form at least two nodes; applying a first learning process to determine a set of arcs to be applied between the at least two nodes; applying a second learning process to determine a set of states to be applied within each node; applying a third learning process to determine a set of probabilities applicable to the states learned in the second learning process; and applying a fourth learning process to update a structure of the at least two nodes, the set of arcs, the set of states within each node, and the set of probabilities for the states.

Implementations of the invention may include one or more of the following. The first learning process may include parameter learning. The second learning process may include state learning. The third learning process may include parameter learning. The fourth learning process may include structural learning. The client database may be a relational database. The method may further comprise creating, accessing, and modifying an AD tree, employing an expectation maximization algorithm to provide a value to valueless records in the client database or in the focus database, performing prior discretization of data in the client database to lower noise in the data, applying expert knowledge to data in the focus database, or pre-analyzing the customer database to create a data management system. The retrieving may include retrieving data from a static customer database and retrieving data from a data stream. The forming may include counting the occurrences of possible combinations of data in the client database, and determining the frequencies of the data. The applying a state learning may include applying a clustering algorithm. The applying a structural learning includes applying a process selected from one of the set consisting of: directed Pareto, naïve Bayesian, directed Bayesian, recursive Pareto, whole Pareto, single MDL, multiple MDL, recursive naïve Bayesian, and whole Bayesian. The initial rules may include a rule that columns within the client database correspond to the at least two nodes. The decision engine may be employed for juror selection, and a node may correspond to the age of a juror.

In another aspect, the invention is directed to a method of creating a decision engine including a Bayesian network. The method may include retrieving data from a client database to form a focus database; applying a Pareto learning process to the focus database to form at least two nodes, a set of arcs to be applied between the at least two nodes, a set of states to be applied within each node, and a set of probabilities applicable to the states; and applying a learning process to update a structure of the at least two nodes, the set of arcs, the set of states within each node, and the set of probabilities for the states.

In yet another aspect, the invention is directed to a method of using a decision engine including a Bayesian network. The method includes retrieving data from a client database and forming a focus database; applying a set of initial rules to the focus database to form at least two nodes; applying a first learning process to determine a set of arcs to be applied between the at least two nodes; applying a second learning process to determine a set of states to be applied within each node; applying a third learning process to determine a set of probabilities applicable to the states learned in the second learning process; applying a fourth learning process to update a structure of the at least two nodes, the set of arcs, the set of states within each node, and the set of probabilities for the states; applying evidence to at least one of the nodes; and updating the structure according to the applied evidence using at least one of the first, second, third, or fourth learning processes.

Implementations of the method may include one or more of the following. The method may further comprise displaying at least one of the set of probabilities applicable to the states in at least one of the nodes, or may further comprise creating, accessing, and modifying a decision tree. A target of the modifying is determined using an intelligent decision analysis algorithm.

In another aspect, the invention is directed to a computer program, residing on a computer-readable medium, for creating and using a decision engine including a Bayesian network. The computer program includes instructions for causing a computer to: retrieve data from a client database and form a focus database; apply a set of initial rules to the focus database to form at least two nodes; apply a first learning process to determine a set of arcs to be applied between the at least two nodes; apply a second learning process to determine a set of states to be applied within each node; apply a third learning process to determine a set of probabilities applicable to the states learned in the second learning process; and apply a fourth learning process to update a structure of the at least two nodes, the set of arcs, the set of states within each node, and the set of probabilities for the states.

This invention provides several advantages. A software embodiment of the invention allows computers to learn, reason, predict, and make decisions in real time. The same system combines data mining and data analysis techniques to allow companies to more fully analyze their data assets. The software can be deployed on virtually any computing platform, on any size database or incoming data stream. Decisions may be made which make full use of the most recent information. In other words, companies can tap the unused potential of their historic data as well as having the system learn new trends and behavior patterns. The software is capable of handling incomplete or so-called "dirty" data, reducing time to implementation for a given project.

The software may employ an advanced browser-based GUI to allow administrators to observe the system while the same is operating. The invention may use a custom main memory database to optimize learning performance.

An advantage of the invention is that it may be made easily portable, with a small enough footprint to enable porting to handheld or wireless devices. For example, the inference and decision engines may each be made less than 100 kilobytes in size. E.g., a multiple terabyte corporate database may be essentially reduced to a model requiring only 100–400 kilobytes.

The software may integrate with commercial RDBMS packages, including Oracle, DB2, SQL Server, Sybase, and Informix. The invention allows consolidation of discrete variables, and "discretization" of continuous and non-continuous variables. The invention may implement genetic structural learning algorithms (including simple MDL, multiple MDL, and Bayesian) to determine the important variables (e.g., nodes) and relationships (e.g., arcs) between the variables. The invention may implement parameter learning: automatically calculating "priors", allowing operators to apply "evidence", and calculating "posteriors". The invention may implement state learning to suggest better discrete categories for continuous variables. The decision model may be continuously improved to make the best decisions.

An additional advantage over systems such as rule-based systems is that the software may be optimized from its initialization: other systems, such as RBS, are generally constructed from the initial data and only later trimmed in size and complexity to achieve an optimized system. For example, the software may eliminate noise in the data prior to the same affecting the Bayesian network on which decision analysis is performed. Other systems may only attempt to eliminate noise after the same has become an integral part of the statistics. In neural systems, "overlearning" may occur and similarly result in an unoptimized system.

These and other objects and advantages of the present invention will become more apparent from the background above and the description hereinafter, including the claims and drawings.

BRIEF DESCRIPTION OF THE DRAWINGS

In the drawings, which illustrate an embodiment of the present invention and are not intended to be limiting:

FIG. 4 is a more detailed schematic flowchart of a learning procedure according to an embodiment of the invention.

DETAILED DESCRIPTION OF THE PREFERRED EMBODIMENTS

Although hereinbelow are described what are at present considered the preferred embodiments of the invention, it will be understood that the invention can be embodied in other specific forms without departing from the spirit or essential characteristics thereof. The present embodiments are, therefore, to be considered in all aspects as illustrative and not restrictive. Accordingly, the invention is limited solely by the claims appended hereto.

The invention is at least partially based on Bayesian analysis, a complex branch of probability theory. The key operation of a BN is the computation of posterior probabilities. A posterior probability of a variable is the probability distribution for the variable given all of its conditioning variables.

Figure 1:
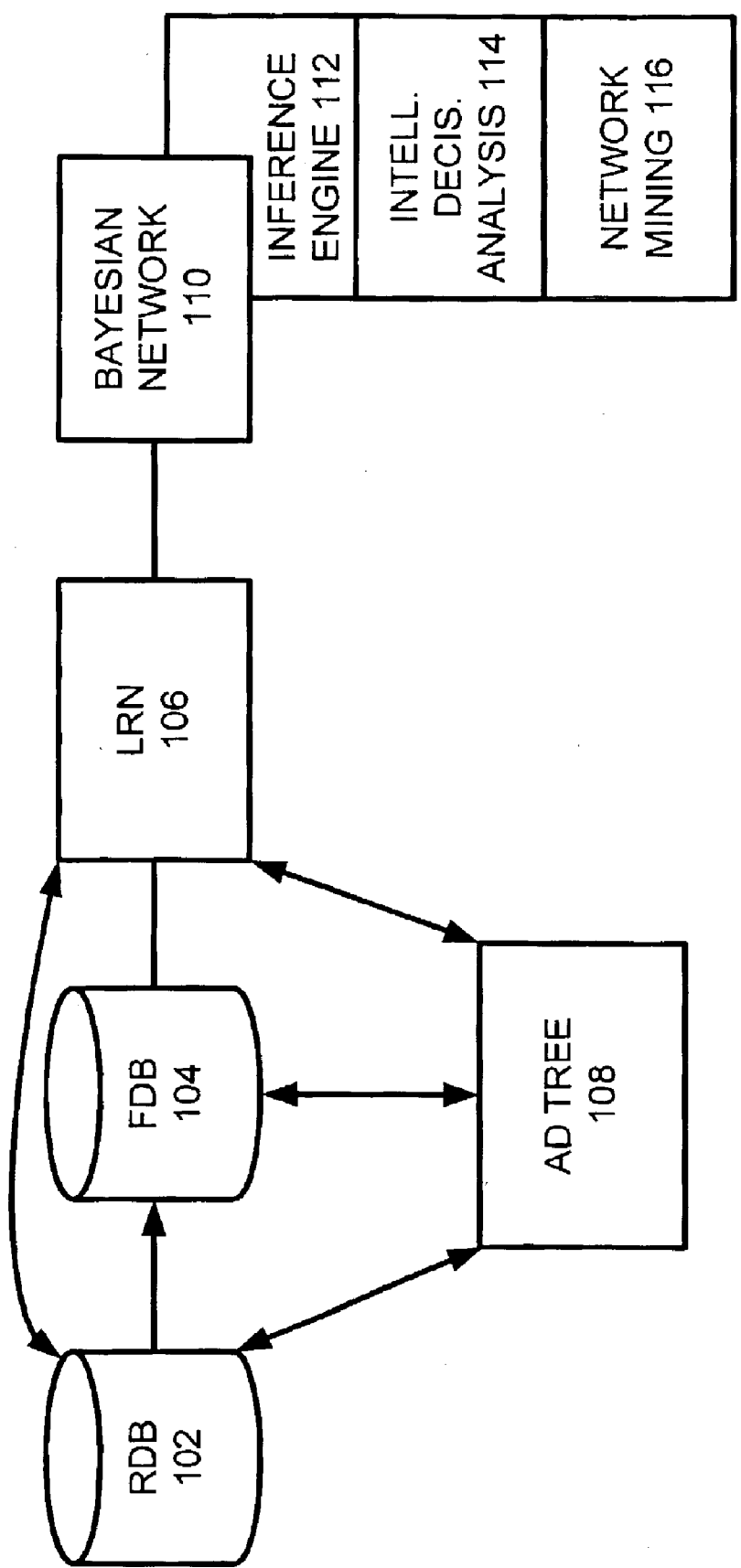
FIG. 1 is a schematic view of a first embodiment of a decision engine according to the present invention.
Figure 2:
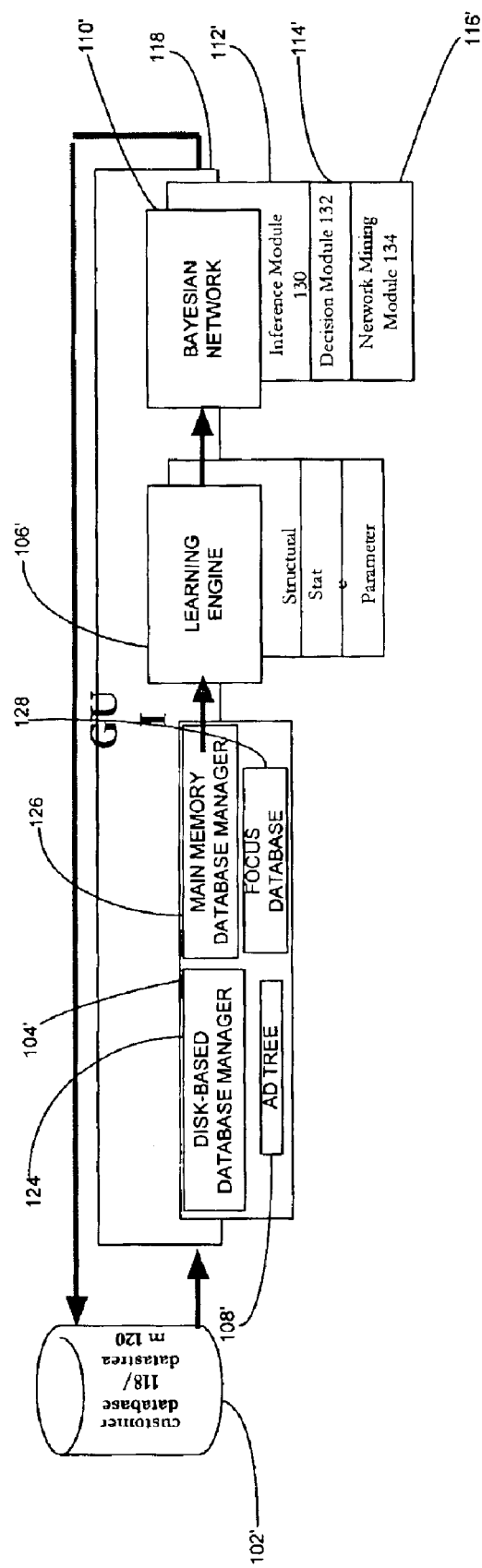
FIG. 2 is a more detailed schematic view of a first embodiment of a decision engine according to the present invention.

Turning now to the drawings, in which similar reference characters denote similar elements throughout the several views, FIGS. 1–2 illustrate one embodiment of a software system of a decision engine constituting the invention.

Decision Engine

By way of brief summary, and referring to FIG. 1, one embodiment of the system may be seen to include a database, which may be, but is not required to be, a relational database ("RDB") 103. Information from RDB 103 may be transformed into a focus database ("FDB") 104, which summarizes frequency relationships between the elements of RDB 103. A technique for doing this is described below. FDB 104 may create, access, and modify an AD tree 108 to be explained in more detail below. AD tree 108 is an explicit representation of scenarios that can possibly emanate from a given decision.

A learning engine ("LRN") 106 accesses FDB 104 and thereby creates and later modifies a BN 110. Learning engine 106 is also described in more detail below. BN 110 may in turn employ an inference engine 112 and an intelligent decision system 114. Network mining may be performed via a network mining module 116.

A more detailed description is given below with respect to FIG. 2. Referring to FIG. 2, a customer database 102' may include both a static database 118, which may be a state of database 102' upon its initial introduction into the system, and a data stream 120, which may represent new and updated information received by the customer and in turn sent to a software system according to the embodiment of the invention.

Customer database 102' may most often be a relational database, such as those available from Oracle® or Informix®. A relational database is one in which data is contained in several tables of cells, and the tables are combinable by joining them, usually by looking for columns in two or more tables that are the same. More details on relational databases may be found in *Data Warehousing, Data Mining, and OLAP*, by Alex Berson and Stephen J. Smith (McGraw Hill 1997), previously attached as part of the related provisional application and incorporated herein by reference.

The system may "pre-analyze" customer database 102', creating a data management system ("DMS") 104'. DMS 104' is responsible for providing compressed customer data to a learning engine 106' described below. Initially, DMS 104' is responsible for using "translation rules" to both filter out unnecessary data and to compress relevant data (with as little data loss as possible). The compression of data (and therefore "states") is used to improve the speed of model generation by learning engine 106'.

Part of the data compression may involve combining multiple variable states into a single value. This process can work with learning engine 106' to determine which states can be combined with minimal impact on the accuracy of the generated model. It should be noted that this is an iterative process. Both an AD tree 108' and a main memory database manager 126 may be used by DMS 104' to improve the speed of response to learning engine 106'.

DMS 104' may then drive the remaining analytic and decision systems, allowing for real time learning based on new information. DMS 104' represents information extracted from customer database 102', e.g., an RDB, as so transformed. An example of the transformation is to count the occurrences of all possible combinations of data, thus determining the relative and absolute frequencies of the data.

One way of transforming RDB 102' into an FDB may be via the technique disclosed in U.S. Pat. No. 5,696,884 to Heckerman et al. for "Method for Assisting in Rendering a Decision Using Improved Belief Networks", and U.S. Pat. No. 5,704,017 to Heckerman et al. for "Collaborative Filtering Utilizing a Belief Network", both of which are incorporated herein by reference in their entirety. By way of this transformation, useful information need not be lost. Any information that is lost may relate to the differentiation of the data within the particular states into which the data is being fitted.

As will be described, the embodied program may continuously sample the database for improvements to the state groupings, and thus may recover from any failures or loss of information based on this transformation.

Prior discretization may be performed on the data in the customer database so as to mitigate noise in the data and to make the learning process proceed more rapidly than without.

The results may then be stored in an FDB 128. Management of FDB 128 may be via the two different managers mentioned briefly above. These managers are software systems that manage relational databases. The first is a disk-based database manager 124, and the second is a main memory database manager 126. Either database manager may optionally cleanse and/or consolidate variables or values, based on expert knowledge or autonomous learning, although main memory database manager 126 may be particularly suited to this as it would likely run faster. Disk-based database manager 124 may preferably handle the larger cases at the cost of speed. Main memory database manager 126 may be especially employed to increase the speed of database data retrieval, so long as these databases, or an important portion thereof, are of a size capable of fitting in RAM memory. For these cases, use of main memory database manager 126 alleviates or at least substantially reduces the need for disk database access.Both disk-based database manager 124 and main memory database manager 126 may be accelerated by use of AD tree structure 108', which may be optimized for the types of queries expected to be performed. While the database stores answers to the specific queries, AD tree structure 108' stores answers to the more generalized queries. When employed in combination, requested data may be retrieved at exceedingly high rates.

In more detail, AD tree 108' is an accelerator structure. AD tree 108' starts with a root node which stores the number of records in the database, and which points to another layer of nodes depending from the root node. Below that is a layer of nodes, i.e., sub-nodes, each of which assumes knowledge of the state of one variable. These sub-nodes store how many records of the database have the records of the first state, the second state, and so on until all states of that particular node are completed. These sub-nodes may also store pointers to another layer of nodes, i.e., sub-sub-nodes, each of which specify two variables. The layers can continue to branch off. However, every possible combination of variables possible in the database is not present, therefore the tree is limited. Also, as the number of layers grows, the time required to query the AD tree can become longer than querying the database itself. Therefore, the growth of the AD tree may be limited to a specific number of layers.

In essence, the records of FDB 128 are essentially leaves of AD tree 108', i.e., the specific cases. These cases are combined to answer most queries, since the queries are usually more general in nature, and therefore require adding the frequencies of a number of database records/leaves. AD tree 108' is a simple and organized way to store these general query results in a manner that allows rapid searching and retrieval.

Learning Engine

Learning engine ("LRN") 106' allows the software according to embodiments of the invention to construct a BN model of customer database 102' and to learn from subsequent iterations of the BN model. In particular, LRN 106' operates on FDB 128 via main memory database manager 126 and/or disk-based database manager 128. LRN 106' employs one or more of various learning techniques in order to create the BN from the data, which may be frequency data. Learning techniques which may be employed by LRN 106' are described below.

Embodiments of LRN 106' may employ one or more of the following learning techniques: parameter learning, state learning, or structural learning. More details of these and other various learning techniques may be found in *Probabilistic Reasoning in Intelligent Systems: Networks of Plausible Inference*, Judea Pearl (Morgan Kaufmann 1988); *The Foundations of Decision Analysis*, Ronald A. Howard (Stanford 1998); *Intelligent Decision Systems*, Samuel Holtzman (Addison-Wesley Publishing Co. 1989); and vol. I through V of the attached collected papers, the entirety of which were attached as a portion of the disclosure of the related provisional application and are hereby incorporated by reference.

These learning techniques are now described in greater detail below.

Parameter Learning

In general, parameter learning assesses the probabilities, which may be conditional, assigned to a particular state of a variable.

Parameter learning may be employed at various levels. The first level uses only complete records. This embodiment is simple and quick, but discards and wastes the most records. At a second level, the only records analyzed are those that are complete in the query rows. This embodiment requires more time than that of the first level, but uses more records. A third level may be termed in one variety "expectation maximization". This level takes even more time, but allows use of all the records. In particular, expectation maximization fills in variable values for missing records; this known technique is described in more detail below.

More details of parameter learning are provided in the book by Pearl incorporated by reference above, e.g., at page 382.

State Learning

State learning determines the optimal breakdown of a particular variable into a set of states. It is essentially a clustering algorithm, deciding which records in the database are most like other records and thus which can be grouped together. Such clustering algorithms are known.

Like parameter learning, state learning may also be employed at several levels. In one level, continuous discretization, numerical values attributed to a variable that are close to one another are generally related. For example, salaries may exhibit such a continuous discretization. A person earning $80,000 and another earning $80,001 should likely be grouped together for particular purposes.

In another level, non-continuous discretization, numerical values attributed to a variable that are close to one another need not be generally related. For example, area codes or zip codes may exhibit such a non-continuous discretization. The clustering algorithms, and in particular those employed as part of the invention, may be able to contend with both types of variables, continuous and non-continuous, and the same may be able to understand and contend with the differences between the two.

Structural Learning

Structural learning determines which information in the database is relevant to the case at hand. Structural learning may also determine the optimal organizational structure of the data and how the data relates to each other.

Structural learning techniques may be broken down, e.g., into those that optimize for the prediction of one variable and those that optimize for the prediction of the whole network.

For the former, one-variable learning may be categorized according to whether the learning is via directed Pareto (i.e., directed towards a subset of nodes), naïve Bayesian, or directed Bayesian.

For the latter, whole network learning may be categorized according to whether the learning is via recursive Pareto, whole Pareto (i.e., directed towards the entire network), single MDL ("Minimum Dispersion Length", i.e., a technique that maximizes the ratio of accuracy to data source size), multiple MDL, recursive naïve Bayesian, or whole Bayesian.

Structural learning may also be facilitated, accelerated, and made more convenient by the construction of AD tree structure 108' within DMS 104'. This tree structure is termed a "Join Tree". As noted above, the AD tree only needs to be expanded in each area to the layer equal to the number of parents of the particular node that represents that data. For the node containing data and influences on X, e.g., having two parents, the AD tree, in the area of X, needs to be expanded to only two layers beyond the first level. This greatly simplifies the calculation as usually any one node only has up to a maximum of a certain number, e.g., five, parents. Even at that point, the parent nodes are usually not highly connected with each other in the conditional probability sense.

This allows another simplification. The parent nodes may be split into two or more separate groups. Their data may be combined into another just-added node, the inputs into the main node being simplified at the cost of an additional node to the system. The overall complexity of the system is roughly proportional to the sum of the complexity of each node, which in turn is just the product of the number of states of the main node and all of its parents.

All of this occurs in "Join Tree" space, not the Bayesian Network, as the Bayesian Network can split and rejoin. The Join Tree is a simple tree, thus speeding calculations in this so-called "Join Tree space". Join Tree space also differs and calculations are thereby enhanced by the fact that the same clearly defines how the nodes need to be clustered.

Bayesian Network

The BN module stores and manipulates the information and data contained in a DN. There are three major components to this module: an inference engine module 130, a decision analysis module 132, and a network-mining module 134. It will be clear to one of skill in the art that each module is not necessarily required. However, each module may build on the prior ones, e.g., the decision engine may require the presence of the inference engine. Most problems solved by the program (like learning) only require the use of the inference engine. Generally, only the most complex of models or questions of those models would require, e.g., the network-mining module.

Inference Engine Module

An inference engine module 130 calculates the effects of data or evidence, or the lack of data, on the data set or BN. Since BN 110' can answer queries no matter whether the BN was given no data or complete data, it is indifferent in this respect. Any data BN 110' does not receive it assumes to be not available or missing, and calculates accordingly.

When the decision engine and network mining module are included, an embodiment of the program can answer questions regarding optimal decisions, including how much should one be willing to pay (in a utility sense) to get more data, if any. Any of this data can be fed, and often will be fed, back into the database via a transaction system or some other system. This captured data can be used to verify and update/optimize the model, as well as update/optimize the learning process. For this reason, FIG. 2 shows an arrow from inference engine 130 back to database 118 and the learning process. The mechanism of the arrow may be via the transaction system or another system that behaves similarly.

Decision Analysis Module

A decision analysis module 132 calculates the optimal decision that the information in the BN recommends. In other words, given the BN created by the database, as updated by decisions made and information added since the original BN creation, decision analysis module 132 calculates the decision having a highest score. In this context, the term "highest score" refers to having (1) the highest value to the user as modified by the Bayesian probability of achieving that value. In some simple cases, this may be a simple expectation value. In this way, the invention may employ intelligent decision analysis. Intelligent decision analysis is a specific form of decision analysis where certain areas of the decision tree are added, modified, or deleted. For example, an embodiment of the invention may use a database, expert knowledge, and/or a rule set and learn from the same. What is learned is a BN and its network structure, i.e., how the nodes are connected and what the parameters are that go into the nodes. The learning is as noted above and below. Learning may be done in several ways that are increasingly complex and time consuming. These tend to be increasingly accurate and capable of dealing with missing data.

A Network Mining Module may be used to mine the BN for the reasoning behind a particular decision or inference.

Method

The foregoing description shows an embodiment of the invention in terms of the structural components. The method and processes of the invention are now described.

Figure 3:
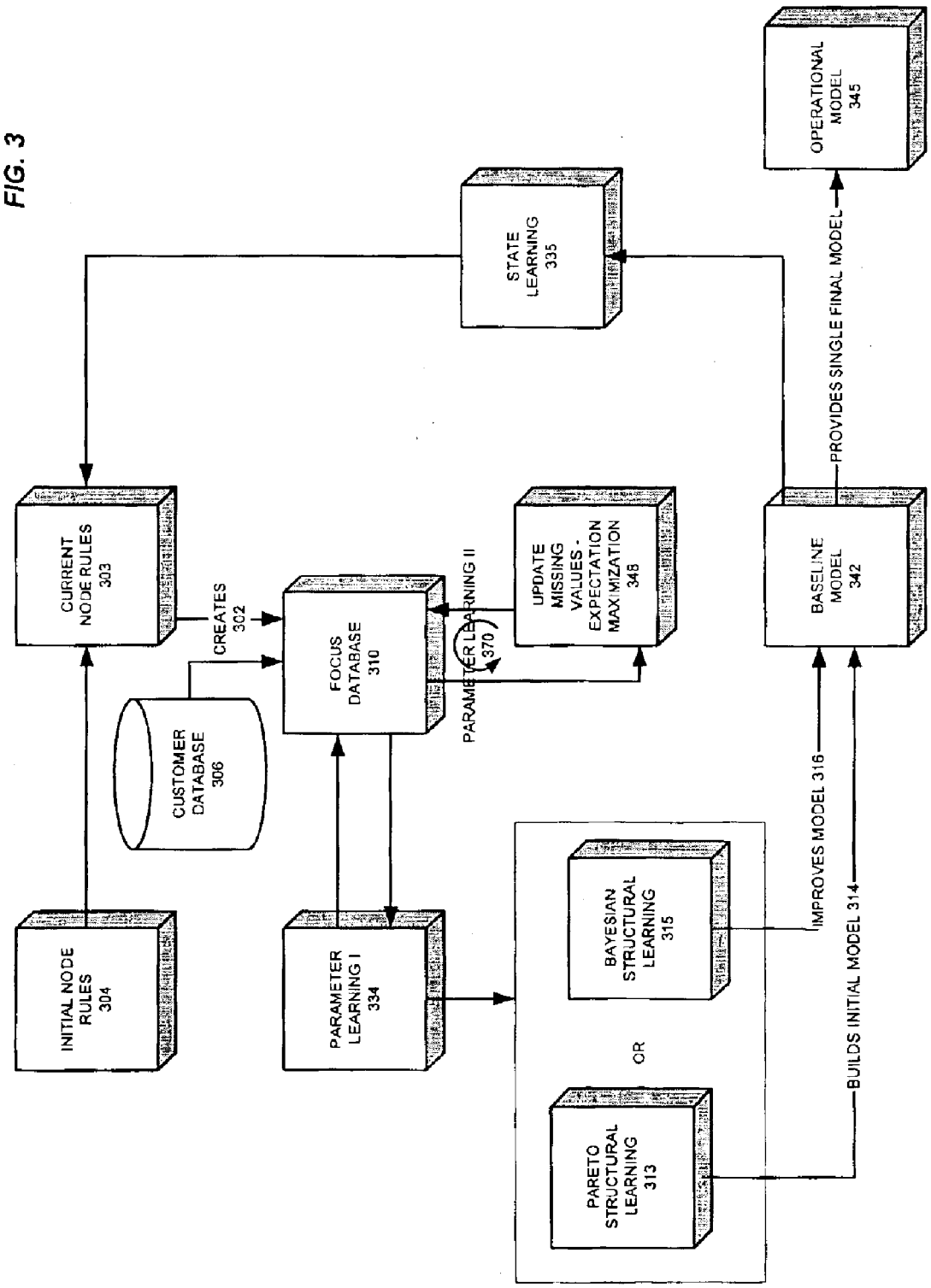
FIG. 3 is a schematic flowchart of a learning procedure according to an embodiment of the invention.

A detailed embodiment of the learning and operations processes according to the invention is shown in FIGS. 3 and 4. These processes may correspond to the operations of LRN 106 or 106' described above, for example. In particular, referring to FIG. 3, a simple description of three learning loops is shown. It may be seen that an FDB 310 is created via the combination of node rules and a customer database 306. The node rules are represented by a set of current node rules 303. The starting point for the node rules is represented by a set of initial node rules 304. Customer database 306 and the node rules determine FDB 310. FDB 310 generally has a smaller size than customer database 306, as FDB 310 omits information that is not relevant to the the construction of the BN. For example, if a particular grouping results in a range of ages of people 18–40 being in one group, the number of people with ages 18, 19 etc., individually, becomes irrelevant.

Current node rules 303 form a portion of what may be termed the "state-learning loop". They may initially have values corresponding to initial node rules 304. However, in such cases as initial node rules 304 are unavailable, they may also be supplied by the system in a manner to be described. Current node rules 303 may include state groupings, which nodes are being processed, what the importance of each node is, etc.

FDB 310 then undergoes one and perhaps two types of parameter learning. Parameter learning may be considered to be simpler than the other types of learning. For example, parameter learning tends to have only simple loops associated with it, if any. Parameter learning essentially involves reading and analyzing the contents of FDB 310.

One type of parameter learning is termed Parameter Learning II and is represented by a loop 370 and a step 348 in FIG. 3. This type of learning fills in for missing data, if any. This step is optional, but may result in a more efficient and accurate BN. In this step 348 and loop 370, a technique of, e.g., expectation maximization is employed to fill in for missing data. With this technique, missing data in a record is replaced with a variable. The variable initially has a value set by the expectation maximization algorithm. However, as the system becomes more accurate with an increasing number of records, the variable placed in the missing data record may also be updated, leading to even further increased accuracy. This technique is known in the art.

To employ expectation maximization 348, a baseline model, explained below, may be in place. If there is no baseline model in place, an initial loop of, e.g., Pareto structural learning 313, must be performed to provide an initial baseline model, i.e., an initial first best guess. Pareto structural learning 313 is a type of the other parameter learning technique, parameter learning I 334. Following initial Pareto structural learning 313, Bayesian structural learning 315 may be employed. Bayesian structural learning 315 generally performs deeper studies into the structure of the data. One aspect of Bayesian structural learning 315 provided for in this embodiment of the invention is that when two models are compared, a Bayesian system is actually doing the comparison.

Of course, customer database 306 itself may provide guesses as to the node structure, e.g., the columns may be used as first guesses at the nodes. In this case, such guesses form a part of initial node rules 304.

The most basic structure of the BN may then be gleaned from baseline model 342. However, this assumes that the user is satisfied with the state groupings, e.g., age groupings, as provided by the node rules or the Pareto learning process. A state-learning step 335 may be employed to analyze if the groupings calculated are, and continue to be, the best groupings for the particular set of data. For example, in the example above, it may be found to be desirable to change the initial grouping into groups of ages 18–25 and 26–40.

The parameter learning and structural learning loops discussed above can be performed in any order or frequency. For example, it may be preferable to perform some initial Pareto structural learning loops, followed by some Bayesian structural learning loops, followed by some state learning loops. Once an acceptable baseline model 342 is achieved, more records may be retrieved from customer database 306 to add to the model (if less than all of the records had originally been employed) or to test the model.

A more detailed embodiment of a learning process is shown in FIG. 4. FIG. 4 distinguishes the first pass or loop, left of the dotted line, from later passes or loops, right of the dotted line.

A set of blank state grouping rules 402 provide the default rules. A set of initial state translation rules 404 are obtained by either a manual (step 424) or a default (426) modification of blank state grouping rules 402. Manual modification 424 of blank state grouping rules 402 refers to manually-entered state groupings. Initial state translation rules 404 then provide the first guess at current state rules 408. Current state rules 408, in combination with a customer database 406, are used to form an FDB 410.

As noted above, the initial set of nodes for a BN may be determined simply by the columns in customer database 406, step 422. The nodes then form an initial structure 412, this structure lacking arcs and parameters. Of course, in certain situations, herein termed "numerous column" situations, where the above procedure would lead to an excess of nodes, it may be desirable to look at the problem in the opposite way, taking the various states as nodes and using the columns as states within the nodes. Alternatively, in a numerous-column situation, much of the structure may be placed into the BN via the use of expert knowledge. Parallel processing, of course, may be used to analyze a numerous-column situation from first principles, i.e., using the original techniques described above.

The next attempt to obtain structure (step 420) is to determine the relevant arcs. The set of all possible arcs is determined (step 418). For n nodes, there would be n(n−1)/2 possible arcs. Parameter learning is then employed to determine the relevance of all of the possible arcs. The most relevant arcs are added (step 428) as part of the structure of the BN (step 416). One way of determining which arcs are most relevant is by squaring the relevance of each arc, this distinguishing even more the relevant arcs from those that are generated by noise. Other techniques for determining relevance may also be employed.

The resulting structure has both nodes and arcs (step 414). The next step is to determine the parameters for the nodes and arcs. This is done by retrieving structure 434, step 436, testing parameters for structure 434, and determining which parameters are best for structure 434. Once the relevant parameters are chosen, the same are added to structure 434, step 440, and a resulting structure 430 is complete.

Structure 430 then is initialized (step 444) as a baseline model 442. At this point, the program moves to the "LATER PASSES" portion of the diagram. Of course, prior to the LATER PASSES portion of the diagram, a parameter learning loop 470 may be employed to update FDB 410 as to the same's missing values, if necessary, via e.g. expectation maximization (step 448).

Baseline BN model 442 may then be used for decision analysis. At the same time, as well as subsequently, baseline BN model 442 may be optimized. One way of doing this optimization is via a structural learning loop 460 shown. In particular, baseline model 442 is altered somewhat (step 454) to create an alternate model 450. Alternate model 450 may be simply a copy of baseline model 442 with some feature changed. Baseline model 442 is then compared to alternate model 450 (step 456). Alternate model 450 is then either recommended or not (step 452) depending on whether the comparison test showed alternate model 450 to be better or worse, respectively, than baseline model 442. If alternate model 450 is better, then baseline model 442 is replaced with alternate model 450(step 458), and alternate model 450 thus becomes a new baseline model 442.

Numerous models may be maintained according to the limits of the system memory. The system may maintain information about the various models in a way analogous to known genetic modeling. The system is aware of what alterations resulted in better models before, these presumably being likely candidates for what alterations will work in the future. Essentially, a Bayesian decision process may be performed on what the structure of the model should look like, i.e., a Bayesian decision about Bayesian models. One way of performing the comparison test is to process various records from customer database 406 through the models to probabilistically determine which model describes the data with higher accuracy.

It should be noted that the "alter model" step 454 may include many ways of altering the model. For example, step 454 may include merging models, deleting nodes, deleting arcs, altering parameters for a node, etc. In a similar fashion, a state learning loop 468 may be used. From baseline model 442, the states within the various nodes are altered (step 461) to generate alternate states 462. Alternate states 462 are then compared (step 466) with the states of baseline model 442. Depending on whether a more accurate BN is produced or not, alternate states are either recommended or not (step 464). The recommended states are sent to current state rules 408 to modify the same accordingly. For structural learning loop 460 and state learning loop 468, as well as the other loops, an equilibrium is reached once no changes are recommended in the model. Of course, once new data is entered the customer database, the equilibrium may be disturbed and processing through the loops may again be necessary. Generally, once new data is obtained, parameter learning is as noted above relatively simple to implement. Parameter learning also of course feeds into the node parameters, which are the most likely to be changed with new data. For example, the parameters of a typical BN may require updating every day or so. The portion which may change next most often is structure, i.e., the nodes and arcs themselves. For example, the structure of a typical BN may require updating every couple of weeks. On the other hand, the states of a typical BN may require updating only every few months, if at all.

OTHER APPLICATIONS

Conversion of a Bayesian Network to a Neural Network and Vice-versa

As noted above, Bayesian systems are learned systems. After the process of learning, the resulting system is a BN. BNs are "transparent" in the sense that the reasoning behind the inferences so drawn is evident from an examination of the BN.

On the other hand, NNs are not transparent. NNs are systems designed to mimic the highly parallel processing techniques of the human brain's neural system. NNs are processing models employing neurons and highly parallel processing to do pattern solving. For this reason, they are opaque in that the reasoning is not at all evident from an examination. In the case where physician diagnosis may be based on the output, physicians generally will not accept and act on a computer system's advice without knowing the basis for the system's decision. Thus, this is a significant disadvantage. However, NNs are known to be very fast in their analysis as they provide the extreme in distributed processing.

In this embodiment of the invention, a BN is used to create an NN. The BN may be created by any of the processes described herein. The knowledge within the BN is translated into the format intrinsic in an NN. After the translation, the NN advantageously adopts the speed advantages of the NN, yet maintains the transparency of the BN. The NN may still be self-modifying, so long as the feedback loop is maintained. Certain learning techniques for NNs may be found in patents to, e.g., Kohonen and Grossberg.

In addition, the NN created is generally more optimized than a "normally" trained NN because the BN may optimally calculate the number of hidden or missing layers and connections, i.e., the neural pathways, neurons, weight accorded each neuron, and the network itself. This calculation, it should be noted, is generally one of the more difficult steps of the NN creation process. By optimizing the pathways, the resultant NN requires less neurons, whether implemented in software or hardware, and is also faster to create and/or run.

NNs may also be employed to optimize or accelerate a BN's inference or learning procedures. The BN may also be used in this embodiment as a visualization tool to understand the inner workings of a trained NN. In other words, the flaw of NNs described above, opacity, may be overcome.

A BN may be translated to an NN, and an NN may be translated to a BN.

PDA/3G Applications

Mobile e-commerce (or "M-commerce") is rising quickly in importance in the world economy. M-commerce demands more sophisticated and intelligent applications to manage the security, integrity, and organization of large amounts of critical data. Banking, voice communication, credit card transactions, and personal identification are essential parts of the new systems. This presents a new set of concerns in security and efficiency. Such security issues may be particularly important as fraud with a 3G wireless PDA may be considerably more damaging than that conducted employing only, e.g., a 9,600 baud personal handheld organizer.

M-Commerce and pervasive computing can be improved by deploying the inventive Bayesian models and decision engines directly to a PDA and/or wireless device. Here, the term "pervasive" computing refers to the trend of placing computing machines or chips in numerous locations for convenience throughout modern life. The PDA and/or wireless device may learn from the habits of the user and request additional identification or information if a change in behavioral patterns is detected. Handheld devices can learn in real time and adapt to the preferences of the user.

On the data input side, companies can extract information from their corporate databases to create intelligent decision systems for their front-line employees using handheld/wireless devices.

A major difference between handheld devices and typical desktops is the addition of a communication buffer that allows the handheld to converse in a wireless manner. In addition, the code for the application requires porting into the handheld compatible language, such as WAP and WML.

The various learning loops employed by embodiments of the invention were described above. It is noted here in connection with Palm, wireless, and handheld applications that in certain portions of those loops, for example, when determining the number and placement of arcs in structural learning, the size of the memory of the handheld device may play a role. In particular, the size of the memory of the handheld device may in part determine the number of arcs employed, as each arc requires an allocation of memory in the device. The speed of the device may be used to employ similar limitations on the number of arcs, states, etc.

Web Advertising/Personalization Model

A database implemented via a Bayesian network is advantageous as it does not violate individual privacy since individual records are not kept. Yet, the same can also determine changes in customer trends to better select which products to promote and at what prices in order to maximize profits on a customer-by-customer basis.

Jury Selection

In all trials the selection of the jury can make or break a case. This is true for the Plaintiff (or Prosecutor) and the Defendant. Both sides seek an edge in the trial by attempting to select jurors that most likely would be sympathetic to their point of view.

One factor in the selection process is the prospective juror's age. Thus, in a decision engine employing a BN that is used for juror selection, age would be a useful node to have in the BN diagram.

In this example, only the selection process as it relates to the age of the prospective juror is discussed, and why an attorney may want to exclude a candidate based on his or her age. Other criteria may also be used, of course.

Every person's beliefs and tendencies have been formed in part by their past experiences, the events of their lives and how their peers may have viewed them. The first settlements in the United States (and the world) started as small communities where every member knew each other. Since their society was small there was a strong tendency to obey the rules of the society since any digressions suffered immediate reprisals by their neighbors and fellow society members. Information was quick to spread and societal pressure was severe. This was coupled by a strong feeling of independence. Out of necessity people tended to fend for themselves and were more likely to accept responsibility for their own actions.

As neighborhoods increased in size, a person no longer knew all his neighbors and there was less emphasis on pleasing one's neighbors. A person had more freedom to do as one pleases without fear of reprisal.

The result is that the age of a person is one potential indicator of how a juror may sympathize and decide a case. The older a person is, the more likely the person would side with authority in a criminal case. He may know the local police and trust the same explicitly. He may be of the opinion that the police would never lie. He may also be well established in the community, registered to vote, and have an interest in preserving his neighborhood.

On the other hand, he may not be the Plaintiff's friend in a tort case. First, he probably received considerably less income in his lifetime than current salaries and would tend to lowball any damage award. Also, he would tend to be more self-reliant so he may take the position that the Plaintiff should be more careful. A recent case awarded a large settlement to a person who suffered burns from hot coffee purchased. This was likely a younger jury.

The younger the prospective juror the more likely they would be to question authority's testimony, particularly an inner city resident. Also, a younger person would be more likely to do "social engineering" and find for a Plaintiff in a civil case with much less convincing evidence, particularly against a corporation with "deep pockets". He would be more used to receiving governmental (and even parental) assistance, such as educational grants, welfare, housing, etc., which were not available to the older person. Also since the younger person has been more mobile and independent than an older person, the same may have committed more "crimes" such as possession of a controlled substance, speeding, DUI, etc., and thus is likely to forgive minor infractions of the law or require far more a convincing evidence.

The manner of usage and operation of the invention described above being readily apparent from the above disclosure, no further discussion relative to the manner of usage and operation of the invention shall be provided.

With respect to the above description, it is to be understood that the optimum relationships for the parts of the invention, as well as variations in size, function, and manner of operation and use, and equivalents of all the foregoing, are apparent to one skilled in the art. Such equivalents are intended to be encompassed by the invention. Therefore, the foregoing is considered as illustrative only of the principles of the invention. Further, since numerous modifications and changes will be readily apparent to those skilled in the art, it is not intended to limit the invention to the exact structure and operation shown and described, but to encompass all suitable modifications and equivalents within the scope of the invention.

What is claimed is:

1. A method of creating a programmable decision engine for jury selection in a computer-readable medium including a Bayesian network, comprising:

Retrieving data from a client database, said client database containing demographic information about a jury pool and forming a focus database of demographic information about a jury pool, wherein the retrieving includes retrieving data from a static customer database, said customer database containing demographic information about a jury pool, and retrieving data from a data stream;

Employing an expectation maximization algorithm to provide a value to valueless records in the focus database;

Applying a set of initial rules to the focus database to form at least two nodes relating to variables in the demographic information;

Applying a first learning process to determine a set of arcs to be applied between the at least two nodes;

Applying a second learning process to determine a set of states to be applied within each node, the set of states relating to values taken by the variables;

Applying a third learning process to determine a set of probabilities applicable to the states learned in the second learning process; and Applying a fourth learning process to update a structure of the at lease two nodes, the set of arcs, the set of states within each node, and the set of probabilities for the states, such that the focus database of jury pool demographic information is updated and contains updated probabilities for the states relating to each node, and further contains updated information relating to the arcs between the nodes.

2. The method of claim 1, wherein the first learning process includes parameter learning.

3. The method of claim 1, wherein the second learning process includes state learning.

4. The method of claim 3, wherein the applying a state learning includes applying a clustering algorithm.

5. The method of claim 1, wherein the third learning process includes parameter learning.

6. The method of claim 5, wherein the applying a structural learning includes applying a process selected from one of the set consisting of: directed Pareto, naïve Bayesian, directed Bayesian, recursive Pareto, whole Pareto, single MDL, multiple MDL, recursive naïve Bayesian, and whole Bayesian.

7. The method of claim 1, wherein the fourth learning process includes structural learning.

8. The method of claim 1, wherein the client database is a relational database.

9. The method of claim 8, wherein the initial rules include a rule that columns within the client database correspond to the at least two nodes.

10. The method of claim 1, further comprising creating, accessing, and modifying an AD tree.

11. The method of claim 1, further comprising employing an expectation maximization algorithm to provide a value to valueless records in the client database.

12. The method of claim 1, further comprising pre-analyzing the customer database to create a data management system.

13. The method of claim 1, wherein said forming includes counting the occurrences of possible combinations of data in the client database, and determining the frequencies of the data.

14. The method of claim 1, further comprising performing prior discretization of data in the client database to lower noise in the data.

15. The method of claim 1, further comprising applying expert knowledge to data in the focus database.

16. A method of using a programmable decision engine for jury selection in a computer readable medium including a Bayesian network, comprising:

Retrieving data from a client database, said client database containing demographic information about a jury pool and forming a focus database of demographic information about a jury pool, wherein the retrieving includes retrieving data from a static customer database, said customer database containing demographic information about a jury pool and retrieving data from a data stream;

Employing an expectation maximization algorithm to provide a value to valueless records in the focus database;

Applying a set of initial rules to the focus database to form at least two nodes relating to variables in the demographic information;

Applying a first learning process to determine a set of arcs to be applied between the at least two nodes;

Applying a second learning process to determine a set of states to be applied within each node, the set of states relating to values taken by the variables;

Applying a third learning process to determine a set of probabilities applicable to the states learned in the second learning process;

Applying a fourth learning process to update a structure of the at least two nodes, the set of arcs, the set of states within each node, and the set of probabilities for the states;

Applying evidence to at least one of the nodes; and

Updating the structure according to the applied evidence using at least one of the first, second, third, or fourth learning processes, such that the focus database of jury pool demographic information is updated and contains updated probabilities for the states relating to each node, and further contains updated information relating to the arcs between the nodes.

17. The method of claim 16, further comprising displaying at least one of the set of probabilities applicable to the states in at least one of the nodes.

18. The method of claim 16, further comprising creating, accessing, and modifying a decision tree.

19. The method of claim 18, wherein a target of the modifying is determined using an intelligent decision analysis algorithm.

20. A computer program, residing on a computer-readable medium, for creating and using a programmable decision engine for jury selection including a Bayesian network, the computer program comprising instructions for causing a computer to:

Retrieve data from a client database, said client database containing demographic information about a jury pool and form a focus database demographic information about a jury pool, wherein the retrieval includes a retrieval of data from a static customer database, said customer database containing demographic information about a jury pool and a retrieval of data from a data stream;

Employ an expectation maximization algorithm to provide a value to valueless records in the focus database;

Apply a set of initial rules to the focus database to form at least two nodes relating to variables in the demographic information;

Apply a first learning process to determine a set of arcs to be applied between the at least two nodes;

Apply a second learning process to determine a set of states to be applied within each node, the set of states relating to values taken by the variables;

Apply a third learning process to determine a set of probabilities applicable to the states learned in the second learning process; and Apply a fourth learning process to update a structure of the at least two nodes, the set of arcs, the set of states within each node, and the set of probabilities for the states, such that the focus database of jury pool demographic information is updated and contains updated probabilities for the states relating to each node, and further contains updated information relating to the arcs between the nodes.

* * * * *

UNITED STATES PATENT AND TRADEMARK OFFICE
CERTIFICATE OF CORRECTION

PATENT NO. : 6,895,398 B2
DATED : May 17, 2005
INVENTOR(S) : Lincoln T. Evans-Beauchamp et al.

It is certified that error appears in the above-identified patent and that said Letters Patent is hereby corrected as shown below:

Column 9,
Line 51, after 1st "the", delete second -- the --.

Column 14,
Line 45, after "more" delete -- a --.

Column 15,
Line 25, change "lease" to -- least --.

Signed and Sealed this

Fourteenth Day of February, 2006

JON W. DUDAS
*Director of the United States Patent and Trademark Office*